United States Patent
Könitz et al.

(10) Patent No.: US 10,024,378 B2
(45) Date of Patent: Jul. 17, 2018

(54) VIBRATION-LIMITING MODULE AND DEVICE, STRUCTURAL SEGMENT FOR A STRUCTURAL INSTALLATION, AND WIND TURBINE HAVING A VIBRATION-LIMITING MODULE

(71) Applicant: Wobben Properties GmbH, Aurich (DE)

(72) Inventors: Malte Könitz, Hohenkirchen (DE); Martin Kraft, Aurich (DE)

(73) Assignee: Wobben Properties GmbH, Aurich (DE)

( * ) Notice: Subject to any disclaimer, the term of this patent is extended or adjusted under 35 U.S.C. 154(b) by 414 days.

(21) Appl. No.: 14/649,118

(22) PCT Filed: Nov. 29, 2013

(86) PCT No.: PCT/EP2013/075151
§ 371 (c)(1),
(2) Date: Jun. 2, 2015

(87) PCT Pub. No.: WO2014/086686
PCT Pub. Date: Jun. 12, 2014

(65) Prior Publication Data
US 2015/0322923 A1  Nov. 12, 2015

(30) Foreign Application Priority Data
Dec. 4, 2012  (DE) .................. 10 2012 222 191

(51) Int. Cl.
*F16F 7/116* (2006.01)
*E04H 12/08* (2006.01)
(Continued)

(52) U.S. Cl.
CPC .............. *F16F 7/116* (2013.01); *E04H 12/08* (2013.01); *E04H 12/12* (2013.01); *E04H 12/16* (2013.01);
(Continued)

(58) Field of Classification Search
CPC ........................... F16F 7/116; F05B 2260/964
See application file for complete search history.

(56) References Cited

U.S. PATENT DOCUMENTS 3,483,951 A * 12/1969 Bonesho ................. F16F 15/02
188/379
5,543,236 A * 8/1996 Tanaka .................... B32B 15/01
428/614

(Continued)

FOREIGN PATENT DOCUMENTS

| CN | 101852188 A | 10/2010 |
|---|---|---|
| CN | 102713278 A | 10/2012 |

(Continued)

OTHER PUBLICATIONS

AST Bearings LLC (Bearing Materials 2010).*

*Primary Examiner* — Justin Seabe
*Assistant Examiner* — Juan G Flores
(74) *Attorney, Agent, or Firm* — Seed Intellectual Property Law Group LLP (57) ABSTRACT

A vibration absorber module for a vibration-absorbing device, in particular for a vibration-absorbing device realized for suspended attachment of the vibration absorber module to a structural installation, having a bearing structure, a pendulum system, having a pendulum mass, and having a suspension system for suspending the pendulum mass on the bearing structure, the suspension system having a number of pendulum spring elements and having a pendulum mass suspension, which extends between the pendulum mass and the bearing suspension, in the direction of a (Continued)

suspension axis, and the pendulum mass suspension being fastened, by means of its suspension head, to the bearing structure.

30 Claims, 6 Drawing Sheets (51) Int. Cl.
  *E04H 12/12* (2006.01)
  *E04H 12/16* (2006.01)
  *F03D 80/80* (2016.01)
  *E04B 1/98* (2006.01)

(52) U.S. Cl.
  CPC .............. *F03D 80/88* (2016.05); *E04B 1/985* (2013.01); *F05B 2240/912* (2013.01); *F05B 2260/964* (2013.01); *Y02E 10/728* (2013.01)

(56) References Cited

U.S. PATENT DOCUMENTS

| | | | |
|---|---|---|---|
| 6,672,763 B1 | 1/2004 | Tschetschorke | |
| 6,966,154 B1 | 11/2005 | Bierwirth | |
| 7,707,787 B2 * | 5/2010 | Kazama | E04B 1/985 52/1 |
| 8,235,596 B2 | 8/2012 | Suzuki et al. | |
| 8,322,975 B2 * | 12/2012 | Kawabata | F16F 7/10 415/119 |
| 2012/0063915 A1 * | 3/2012 | Kawabata | F03D 80/00 416/244 R |

FOREIGN PATENT DOCUMENTS

| | | | |
|---|---|---|---|
| DE | 197 34 993 | A1 | 3/1999 |
| DE | 202005019949 | U1 * | 1/2006 |
| DE | 20 2005 019 949 | U1 | 3/2006 |
| DE | 10 2008 050 989 | A1 | 4/2010 |
| EP | 1008747 | A2 * | 6/2000 |
| EP | 1 479 938 | A1 | 11/2004 |
| EP | 1 008 747 | B1 | 6/2008 |
| GB | 2040429 | A | 8/1980 |
| JP | S-6353330 | A * | 3/1988 |
| JP | 63-53330 | A | 7/1988 |
| JP | 3213741 | A | 9/1991 |
| JP | 5187481 | A | 7/1993 |
| JP | 643350 | U | 6/1994 |
| JP | 712123 | A | 1/1995 |
| JP | 2003239947 | A | 8/2003 |
| JP | 2008157296 | A | 7/2008 |
| JP | 2009228726 | A | 10/2009 |
| JP | 201125346 | A | 2/2011 |
| JP | 2012122546 | A | 6/2012 |
| KR | 19930013510 | A | 7/1993 |
| KR | 1020110010605 | A | 2/2011 |
| KR | 1020120111911 | A | 10/2012 |
| SU | 1208371 | A2 | 1/1986 |
| SU | 1307078 | A1 | 4/1987 |
| WO | 2012090259 | A1 | 7/2012 |

\* cited by examiner

VIBRATION-LIMITING MODULE AND DEVICE, STRUCTURAL SEGMENT FOR A STRUCTURAL INSTALLATION, AND WIND TURBINE HAVING A VIBRATION-LIMITING MODULE

BACKGROUND

Technical Field

The invention relates to a vibration-limiting module. The invention additionally relates to a device having such a vibration-limiting module, to a structural segment for a structural installation having such a vibration-limiting module, and to a wind turbine having a tower and a tower segment having such a vibration-limiting module.

Description of the Related Art

A wind turbine constitutes a structure that is particularly susceptible to vibration, because of the height and slenderness of its structural form; this applies particularly to tubular steel and prestressed concrete wind turbine towers, which are increasingly being designed for greater rotor hub heights, thereby increasing susceptibility to unwanted vibration. In particular, resonance phenomena of a rotating rotor, which might have vibrating rotor blades, may result in a wind turbine having complex modes, particularly also on the tower of the wind turbine. Nevertheless, it is increasingly important for the wind turbine tower to be constructed in a manner that is sparing of resources, e.g., in respect of reduction of the diameter and wall thickness of the tower. This applies, in principle, to any type of structural form of a wind turbine, but particularly to a wind turbine that has a tubular tower such as, for example, a tubular steel tower or a precast concrete tower.

A wind turbine of known structural form comprises a nacelle, which is mounted on a tower and carries a rotor. Known in the art is the practice of mounting a vibration absorber in the tower. For example, EP 1 008 747 B1 describes a vibration absorber for damping vibrations in a wind turbine by means of an inertia mass, a pendulum rod, a pendulum bearing, or pendulum joint, and damping means. The absorption property is achieved in that the inertia mass vibrates with a phase displacement relative to the structure of the wind turbine. The damping means constitute a structural unit with the pendulum joint, and including one or more elastomer modules, the absorber being such that it can be accelerated in any direction of a plane.

Basically, a vibration absorber is to be understood to mean a structural module that includes a mass and at least one spring and that, as a result of being connected to a vibratory system such as, for example, a wind turbine, can reduce vibrations of that system. The vibration-absorber mass, also referred to as a counter-oscillatory mass, vibrates, in particular, with a phase displacement relative to the main structure of the structural installation such as, for example, a wind turbine. The forces of the vibration absorber that result from acceleration can be passed into the main structure of a wind turbine in which vibrations are to be abated. The effect of a vibration absorber is not limited merely to the point of application of the absorption excitation, but is also effective for other points on the connected main structure. Basically, a vibration absorber can be used for a relatively narrowly limited vibration disturbance frequency, since the vibration absorber generally provides a vibration absorption frequency that is variable only to a limited extent; a vibration absorber is thus to be regarded rather as a static component for reducing vibration. An essential advantage of a vibration absorber, however, consists in that it is comparatively well matched to the unwanted vibration to be absorbed and, if appropriately designed, can almost completely cancel out this unwanted vibration. It must be taken into account that, in the case of absorption there is to be observed, for the coupled system constituted by the vibration absorber and the main structure capable of unwanted vibration, e.g., the wind turbine, a frequency splitting that is outside the absorber frequency, or outside the original vibration disturbance frequency, and that might result in greater vibration amplitudes outside of the absorber frequency.

In contrast to the vibration absorber, a vibration damper, although it can be used in supplement to the vibration absorber, is to be regarded as a system that, by means of a spring and a damper element, connects the counter-oscillatory mass to the main structure that is to be damped. The spring elements and damper elements in this case may be of various designs. Vibration dampers are basically considered to be dynamically acting systems and, compared with a pure vibration absorber, can be used for a broader spectrum of differing disturbance frequencies.

To that extent, the structure of a vibration absorber designated in EP 1 008 747 B1 may be designated rather as a vibration damper. The system, as such, may be designated as a passively acting system.

Concepts for reducing vibration by passive action use damped or undamped structures, which have a mechanically functioning spring and mass system, on a main structure that exhibits unwanted vibration. The use of a passive vibration absorber is particularly suitable for the case, for example, in which the frequency of an unwanted vibration is comparatively well known and lies within a comparatively closely delimited and known frequency range. Irrespective of this, a passive system can be expanded through the provision of an active control element, and thus developed to form an active system; this is effected, for example, in that significant parameters of a main structure or, in particular, of the vibration absorber or vibration damper, are adjusted in real time to variable conditions of the main structure. As a result, other disturbance frequencies that are close to a primarily resonant frequency of a main disturbance frequency can be absorbed and/or damped over a comparatively broad band. In most cases, however, this approach requires an elaborate feedback control system and an external energy supply.

A vibration absorber system, which has a variable natural frequency of the absorber and which can be set in a variable but fixed manner to differing disturbance frequencies, is known from DE 20 2005 019 949 U1. In the latter, an absorber system, realized as an upright pendulum and having an absorber mass, is supported on a base via a spring arrangement, and a basic distance of the center of gravity of the absorber mass can be varied. Provided parallel to the spring arrangement, between the absorber mass and the base, there is a distance definition element, which is resistant to compression and/or tension and variable in length. Basically, such or other upright absorber devices can preferably be used for damping in buildings. DE 197 34 993 A1 describes a comparatively complex reduction of vibration in the case of a building, based on an upright pendulum.

In order to protect structural installations that are susceptible to vibration, it is desirable to provide a vibration limitation system that is comparatively effective in operation, in particular by means of appropriate reduction in the amplitude of an unwanted mode, in particular primarily by means of vibration absorption, that is nonetheless of a reliable design and, moreover, can be constructed in a comparatively simple manner and/or made available in a manner permitting its manipulation.

In the priority application relating to the present application, the German Patent and Trademark Office has researched the following prior art: DE 20 2005 019 949 U1, U.S. Pat. No. 6,672,763 B1, EP 1 008 747 B1 and DE 197 34 993 A1.

BRIEF SUMMARY

One or more embodiments are directed to a device that is designed for suspended attachment to a structural installation, and that is designed to limit an unwanted vibration of the structural installation, in particular to absorb an unwanted vibration, in an improved manner. In particular, the device is intended to provide vibration limitation, preferably vibration absorption, in a comparatively effective and reliable manner, including in the case of active systems. Nevertheless, a device is to be designed that is comparatively simple, but yet reliable and safe.

In particular, a device is to be designed for a resonant phenomenon of a higher natural frequency than the first natural frequency of a wind turbine, in particular of a tower of the wind turbine. Such higher natural frequencies, which, particularly in comparison with the first natural frequency, are associated substantially with a mode that has an antinode in the tower region, are generated by motions of the nacelle, and particularly by a pitching moment of the nacelle. In addition, a rotor, and particularly a rotor motion, can also contribute comparatively complex components of the mode, which are not negligible. This can result in modes that, despite having an open end in the region of the nacelle, nevertheless have a node and an antinode of the mode in the tower region. It has been found that, in particular, a second natural frequency can have an antinode that is not located in the region of the nacelle or directly under the nacelle of a wind turbine, but that may be located significantly below the latter.

One or more embodiments are directed to a vibration absorber module, a vibration-absorbing device, a structural segment for a structural installation, and a structural installation, in particular a wind turbine, of improved design for actively and/or passively absorbing and/or or damping a vibration.

One embodiment provides a vibration-limiting module of the type stated at the outset that is designed, in particular, for suspended attachment to a structural installation, and is realized in the form of a vibration absorber module.

According to this embodiment, the vibration-limiting module has:

a bearing structure, a pendulum system, having a pendulum mass, and having a suspension system for suspending the pendulum mass on the bearing structure, the suspension system having a pendulum mass suspension, which extends in the direction of a suspension axis and is fastened, by means of a suspension head, to the bearing structure.

According to another embodiment, it is additionally provided that the suspension system has a number of pendulum spring elements extending in the direction of a suspension axis, and the suspension head of the pendulum mass suspension has a joint head, which is fastened to the bearing structure and has a pendulum bearing realized as a slide bearing.

In particular, at least one pendulum spring element of the number of pendulum spring elements is fastened to the pendulum mass and the bearing structure in the direction of the suspension axis.

One or more embodiments of the invention combines, in particular, two approaches, namely, in simple terms, firstly, a pendulum bearing, realized as a slide bearing, that is of comparatively simple design but that nevertheless acts efficiently to absorb vibration, and secondly an alignment of pendulum spring elements in the direction of the suspension axis: i.e., in particular, parallel to the pendulum mass suspension.

The aforementioned second aspect of the concept design of the vibration-limiting module provides, with the pendulum spring element extending in the direction of the suspension axis, between the pendulum mass and the bearing structure—also referred to as the vertical direction—in essence, the prerequisite for an elastic spring suspension of the pendulum mass that, in addition, in the context of a preferred development, can be configured so as to be settable, in particular settable in a variable manner.

Moreover, it has proved particularly successful, in the context of a development, to realize the pendulum bearing without damping, i.e., to realize the pendulum mass suspension for a pendulum motion of the pendulum mass. In particular, it has proved advantageous for the pendulum mass suspension to be invariable in respect of length and/or direction; this further contributes to the realization of a simplified, but nevertheless reliable pendulum mass suspension, which therefore has durability and long-term stability.

Another embodiment of the invention is directed to a vibration-limiting, in particular vibration-absorbing, that is realized for suspended attachment of the vibration absorber module to a structural installation.

In particular, it has proved successful to provide a number of vibration-limiting modules, in particular vibration absorber modules. This can be instrumental in achieving both directional variability and vibration absorption over a comparatively broad band, preferably for a relatively high natural frequency of a structural installation such as a wind turbine, particularly of a tower, or a tower of a wind turbine.

Another embodiment is directed to a structural installation having a vibration-limiting, in particular vibration-absorbing, device having a vibration-limiting module, in particular a number of vibration-limiting modules. In particular, in the context of a development, it is provided that the structural segment is realized as a tower segment for a wind turbine and has a vibration-limiting module of the aforementioned type.

Another embodiment is directed to a wind turbine having a tower, and having a nacelle, which is mounted on the tower and carries a rotor, the tower having a tower segment that has a vibration-limiting device of the aforementioned type.

In the case of a wind turbine of the aforementioned type, a generator in the nacelle is connected to a shaft, the shaft being drivable via a number of rotor blades of a rotor that are connected to the shaft via a hub. In this case, a rotor blade is connected to a hub adapter of the hub via a blade bearing. In this way, wind energy can be into a rotary motion of the shaft and used to drive the generator; provided in the nacelle is a series of power converter modules, designed to convert the electric current, delivered directly by the generator, to a grid frequency.

In particular, one embodiment of the invention has identified that an aforementioned tower segment is suitable, particularly advantageously, for installation at approximately $2/3$ of the height of a tower of the wind turbine, in particular in a region between $2/3$ minus 20% to $2/3$ plus 20% of the height of the tower of the wind turbine, to achieve particularly effective absorption of a second natural frequency of a possibly resonant unwanted vibration of the wind turbine, in particular of the tower of the wind turbine.

One embodiment of the invention is based on the consideration that, in particular, a vibration absorber module is suitable as a basis for a comparatively simple and sustained, but nevertheless reliable, reduction in unwanted vibration, but with the vibration absorber module being such that it can be expanded to form a suitable vibration-reducing module; a vibration absorber module can first of all be realized, advantageously, as a passive module, requiring comparatively little in terms of resources but nevertheless being highly effective. One embodiment of the invention has identified that many structural installations, in particular a wind turbine, constitute a vibrational system that is also susceptible to complex, unwanted resonant vibrations. Nevertheless, natural frequencies can be identified within comparatively well definable limits; in particular, higher natural frequencies can also be defined comparatively well for a defined structural installation, in particular a wind turbine. It has been identified that a vibration absorber module can be designed, in a particularly simple and efficient manner, for a known natural-frequency spectrum of disturbance frequencies of a structural installation, in particular a wind turbine.

The invention, in brief, is based on a pendulum system, in particular a pendulum absorber, having a pendulum mass and a suspension system having a pendulum mass suspension. In the case of the suspension system, a number of pendulum spring elements, and a pendulum mass suspension comprising a joint head having a pendulum bearing realized as a slide bearing are provided.

According to one embodiment of the invention, a vibration-reducing module, in particular a vibration absorber module, realized as a suspended pendulum is provided, on the one hand, with a pendulum mounting, which is preferably a slide bearing. For a great variety of reasons, this pendulum mounting is to be preferred to other possible types of bearing. The invention has identified that, by means of a joint head, it is possible to realize a durable suspension system that can be subjected to load and in principle, above all, can provide a maintenance-free slide surface of the slide bearing; the pendulum mass suspension therefore proves to be superior to more elaborate systems and, moreover, provides for particularly efficient reduction of a disturbance frequency of a component, in particular as a result of a slight damping of the slide bearing.

Furthermore, in respect of the pendulum bearing, the invention has identified that, with an appropriately designed slide surface of the slide bearing, the slide surface can be realized so as to be durable and highly reliable over the service life of a wind turbine, despite adverse environmental conditions and even with large pendulum deflection. In particular, the slide bearing achieves an efficient, low-maintenance reduction in unwanted vibration that can also be realized in a compact, space-saving—and thus particularly for a wind turbine, advantageous—manner. The use of a number of vibration absorber modules makes it possible to achieve vibration absorption that is non-dependent on direction, and that is also efficient and simple, even in the case of a joint head fixed unidirectionally relative to the deflection.

Moreover, on the other hand, in the case of a pendulum mass suspension that is invariable in respect of length and/or direction, the invention expressly does not resort directly to the ability to vary the pendulum mass, or the direct pendulum length; this is in order to achieve a compact vibration absorber module. It has been found that, even in the case of an invariable pendulum mass suspension, a pendulum spring element can offer sufficient setting possibilities for setting a pendulum mass suspension in respect of a disturbance frequency spectrum of a structural installation.

In particular, it has been found that there are several advantages in the use of a number of vibration-reducing modules, in particular vibration absorber modules, in the case of a vibration-reducing, in particular vibration-absorbing, device. Thus, in the event of a failure of one vibration absorber, the vibration function is partially retained in any case by the redundant arrangement. Individual vibration absorber modules can differ in their settings, thereby making it possible to realize vibration absorption over a comparatively broad band. And finally, since the mass is reduced for each module, it is possible to realize a yet more durable mounting.

In addition, an embodiment of the invention offers has potential for a preferred anti-drop safeguard and, moreover, also offers the possibility of expanding the vibration absorption concept to a damping concept and/or an actively regulated concept for vibration reduction in a structural installation. The module and the device offer the possibility for both an anti-drop safeguard and end-position damping, as well as a fundamental development of a damping aspect and an active component for a vibration absorber module.

Preferred developments of the invention are given by the dependent claims, which specify in detail advantageous possibilities for developing the device, in the context of the concept relating to the invention, with further advantages.

In the context of a particularly preferred development, at least one pendulum spring element of the number of pendulum spring elements is provided with a spring designed as a compression spring. In particular, each pendulum spring element has a spring, and each of the springs is designed as a compression spring. A compressive spring suspension has proved to be particularly preferable for stabilizing the pendulum mass. In particular, in the case of a pendulum spring element, it can be provided that the spring, under compression, is disposed proximally under a spring disc of a spring mounting. At a proximal end of the spring, i.e., at an end of the spring that is located closer to the bearing structure, the spring is held—preferably on a spring disc—under pretension, in particular under compression. At a distal end of the spring, i.e., at an end of the spring that is initially adjacent to the pendulum mass, the spring is preferably attached directly to the pendulum mass.

Preferably, the pendulum spring element can have a spring mounting designed for variably setting a spring length of the spring. In particular, the spring mounting can be used to set a pretension of the spring, in particular for setting a compression spring force of a compression spring. A compression spring may be designed, in principle, in accordance with DIN 13906.

It has proved advantageous to enable setting of a spring to be effected through the spring length and/or the spring stiffness. In particular, this approach proves to be advantageous in comparison with other approaches for influencing the vibration absorption. Although it is possible, in principle, to alter the pendulum mass and/or the pendulum length for the purpose of further setting of an absorption frequency (in respect of a disturbance frequency), an effective "pendulum length", of comparatively small mass and small size, can nevertheless be effected through the setting of a compressive spring force, or other setting of a spring length of the spring. Overall, a comparatively compact system of a vibration-reducing module, in particular vibration absorber module, is provided. In particular, such a module is suitable for installation in confined spaces of a structural segment and/or of a structural installation.

Various possibilities have arisen for implementing a setting structure for the pendulum spring element. A setting structure has proved particularly preferable in which the setting means to be provided above a bearing structure, in particular above a bearing structure plate. The setting structure preferably has setting means that extend through the bearing structure plate, in particular a base plate, and/or extend through a spring disc. In particular, it is provided that the setting means have a carrier profile, in particular a carrier profile disposed above the bearing structure plate, in particular the base plate. The carrier profile preferably carries a variably settable setting mechanism, and preferably has a stop for an adjustment means of a setting mechanism.

In the context of a particularly preferred design development, it can be provided that, for the purpose of realizing the setting mechanism, the setting structure has a guide rod, having a rotary thread, which engages in a threaded hole of the carrier profile that serves as a stop, the guide rod having proximally a point of application for rotary means and distally an adjusting means realized for displacing the spring disc. The adjusting means can have, for example, a stop, for example in the form of a locknut or the like, that engages behind the spring disc.

Preferably, the spring is distally connected directly or indirectly to the pendulum mass.

In the case of a pendulum mass suspension that is invariable in respect of length and/or direction, it has proved advantageous in the overall design to alter an effective pendulum length just by setting a spring length, in particular by setting a compressive spring force of a compression spring. In addition, it has proved advantageous that an elastic spring suspension of the pendulum mass that is non-dependent on direction, i.e., largely balanced for all directions of motion, is achieved in that a number of spring elements are disposed circumferentially around the pendulum mass, in particular around a central pendulum mass suspension.

Preferred developments provide for tuning of the absorption frequency in respect of a disturbance frequency, or unwanted vibration frequency, and, advantageously, the absorption frequency can also be configured for a broad band; in particular, it can be configured for a broader band than would be the case if all pendulum spring elements were tuned identically.

Preferably, it can be provided, in particular, that the number of pendulum spring elements have a first spring, in particular a compression spring, and a second spring, in particular a compression spring, which differ in their compressive spring force. In particular, all pendulum springs can have differing compressive spring forces. It may also prove advantageous to group certain pendulum spring elements into symmetry groups, and to provide the same compressive spring forces for all pendulum springs of one symmetry group, while springs of different symmetry groups have different compressive spring forces.

Overall, an appropriate directional dependence of a vibration-reducing module, or of the elastic spring and damping properties of the same, can be settable in respect of the requirements of the wind turbine and the particular spatial form of a mode of a second natural frequency. This proves advantageous, in particular, in designing a vibration absorber module in respect of the elasticity and/or damping properties, or in respect of effective length and direction characteristics.

In particular, the elasticity and/or damping properties of a vibration absorber module can be set such that they deviate from a rotational symmetry.

Nevertheless, alternatively, a vibrational elasticity and damping characteristic of a vibration-reducing module, in particular a vibration absorber module, that are set so as to be comparatively rotationally symmetrical can be achieved in that the number of pendulum spring elements have a first and a second spring, which have the same compressive spring force. In particular, it can be provided that all pendulum springs have the same compressive spring force.

It has proved advantageous that the pendulum spring elements are of an even number. In particular, a number of at least four pendulum spring elements, preferably six or eight pendulum spring elements, has proved advantageous. The number of pendulum spring elements are preferably disposed symmetrically, in respect of angle of rotation, about the pendulum mass suspension disposed centrally on the suspension axis. The number of pendulum spring elements are preferably directly or indirectly connected, or otherwise fixed, to a top side of the pendulum mass.

Furthermore, preferred possibilities for realizing a design of a pendulum mass suspension can be provided in the context of a development. In particular, it has proved advantageous that the pendulum mass suspension has a pendulum rod that, at its proximal end, carries the joint head. In particular, the pendulum mass is attached at a distal end of the pendulum mass suspension.

For the purpose of attaching the pendulum mass, it is provided, advantageously, that the pendulum rod extends through the pendulum mass along the suspension axis, and the pendulum mass, on a bottom side, bears on a distal stop of the pendulum rod and/or, on a top side, is held on a counter-stop of the pendulum rod. In this way, it is possible for a pendulum mass, even of comparatively heavy weight, to be securely fixed to the pendulum rod.

Advantageously, the pendulum mass suspension is held on a bearing pin in a rotatably sliding manner for the purpose of constituting the slide bearing. Preferably, in the joint head, a bearing pin is held in a bearing pin receiver. The bearing pin receiver is preferably formed on an inner ring of the joint head; in particular, for the purpose of constituting the slide bearing, an inner surface of the inner ring that faces towards the bearing pin is realized as a slide surface.

For the purpose of configuring an efficient and simple slide bearing, it has proved particularly preferable for the joint head to have a slide surface of a single slide bearing. Realization of a single slide surface of a single slide bearing has proved advantageous in order to keep the amount of sealing and servicing to a minimum. In particular, the resource requirement for designing the pendulum bearing has been kept small. Nevertheless, in a modification of a varied pendulum bearing, it can be provided that the joint head has a number of slide surfaces of one or more slide bearings. The latter modification may prove advantageous if a surface force on a slide surface is rather to be reduced, in particular if bearing forces are to be distributed to as large a slide surface as possible.

Preferably, the bearing pin is held fixedly, i.e., non-rotatably, in the bearing pin receiver, in particular locked and/or fixed by a locknut. Thus, in particular the pendulum mass suspension and the bearing pin is realized equal mounting. Preferably, the pendulum mass suspension has a joint head for slide-mounting on the bearing pin, in particular only for slide-mounting of the pendulum mass suspension on the bearing pin.

In a modification, for the purpose of executing a pendulum motion, the bearing pin can be rotatably mounted in the bearing pin receiver. In particular, an equal bearing can be realized between the bearing pin and the bearing pin receiver. Additionally or alternatively, in a modification, the pendulum mass suspension can be rotatably held on the bearing pin.

Further developments have proved successful in respect of the design of a slide surface of the slide bearing, or for the purpose of protecting the slide surface of the slide bearing. It has proved particularly preferable for at least a partial region of the slide surface of the slide bearing to be composed of roller-bearing steel, in particular for the entire slide bearing to be composed of roller-bearing steel. Roller-bearing steel has proved to be particularly resistant, even in the case of slow frictional motion with high compressive forces. Thus, for example, a joint head and/or the bearing pin and/or the bearing pin receiver may be composed entirely or partially—in particular, a slide surface of the same and/or a bearing surface of the same or partial regions thereof—of roller-bearing steel. Slide surfaces of the said components may also be given a special hardening treatment or specially realized in respect of the modulus of elasticity and degree of hardness.

Further, it has proved advantageous for the slide bearing, in particular the joint head and/or the bearing pin and/or the bearing pin receiver, to have a protection against corrosion. A protection against corrosion in the form of a zinc coating has proved advantageous. Corrosion of the slide bearing or, in particular, of the joint head, is thereby virtually precluded.

In particular, it has proved advantageous to provide a means of preventing moisture from entering the region of a joint head, particularly the region of the pendulum bearing, advantageously the region of the slide bearing, or slide bearing surfaces. Preferably, a lip seal can be provided at the side of an inner ring of the joint head. For example, a bearing pin can carry a lip seal. A lip seal can also be varied, for example, in a modified form, as a simple sealing ring or lip sealing ring or such a cylindrical sealing ring.

Particularly preferably, the vibration absorber module can be protected with further measures, in order to reduce an unwanted vibration as effectively as possible.

In particular, the pendulum system can have at least one damping element that, in addition to the self-damping of the pendulum spring elements, damps an absorption vibration of the vibration absorber module. Although this may possibly damp the amplitude of the vibration absorption frequency, it nevertheless enables the vibration absorption to be designed for a broader band.

It has proved advantageous, in particular, for a vibration absorber module to be provided with an amplitude limiter and/or end-position limiter. This has proved advantageous, in particular, if a number of vibration absorber modules—possibly in close spatial proximity to each other—are mounted in a device. As a result, collision or other contact-like proximity of the vibration absorber modules is either reliably prevented and/or an appropriate shock absorption is provided in the case of a maximum deflection.

It has also proved advantageous for the suspension system to have an anti-drop safeguard; in particular, a tensioning structure between the pendulum mass and the bearing structure has proved advantageous. Preferably, a tensioning structure that can be tensioned in a settable manner can be provided, extending between the pendulum mass and the supporting structure.

In general, in the case of a suspension system, an anti-drop safeguard has proved advantageous in order that, in the worst case of a failure of the suspension system, a pendulum mass is still held on the bearing structure and/or, alternatively, in order to prevent an unimpeded drop of the pendulum mass in any case. In particular, the suspension system, in addition to having an amplitude limiter and/or end-position limiter that more of a stopper function, may have a pendulum damping, which is designed to damp the pendulum motion during a free pendulum motion.

In a development, the vibration-reducing module, in particular the vibration absorber module, offers the possibility of connecting an active control element to the pendulum system. The active control element is realized, in particular, to regulate a free pendulum motion of the pendulum mass.

In particular, this active control element can be part of an active feedback control system. An active feedback control system preferably has:

a phase detector, for detecting a relative phase between a vibration absorber module and a disturbance frequency of a structural installation or structural segment, a regulator, and a power amplifier, for converting the control variable to the active control element.

In the case, the vibration absorber module is expanded from a merely passive module to an active module.

For the purpose of developing the vibration-absorbing module, it can be provided that a number, in particular an even number, of vibration-reducing modules, in particular vibration absorber modules—of wholly or partially identical design or, also, of differing design—is provided.

If, in the case of a vibration-absorbing device, there are a number of vibration absorber modules of identical design, it is possible to achieve a highly efficient, but comparatively narrow-band, absorption of vibration in a structural installation. If a number of vibration absorber modules that differ in length and/or have differ in same direction of swing and/or in spring tension setting are mounted, the vibration-absorbing device can nevertheless be designed for a comparatively broad band.

Exemplary embodiments of the invention are now described in the following, on the basis of the drawing, in comparison with the prior art, which is likewise represented in part. The drawing is not necessarily intended as a true-to-scale representation of the exemplary embodiments but, rather, the drawing, where used for explanation, is in a schematic and/or slightly distorted form. With regard to information supplementing the teaching that can be obtained directly from the drawing, reference is made to the relevant prior art. It must be taken into account in this case that various modifications and alterations, concerning the form and detail of an embodiment, may be made without departure from the general idea of the invention. The features of the invention disclosed in the description, in the drawing and in the claims may be essential for the development of the invention, both singly and in any combination. In addition, all combinations of at least two of the features disclosed in the description, the drawing and/or the claims come within the scope of the invention. The general idea of the invention is not limited to the exact form or the detail of the preferred embodiment shown and described in the following, or limited to a subject-matter that would be limited in comparison with the subject-matter claimed in the claims. In the case of specified measurement ranges, values lying within the said limits are also intended to be disclosed as limit values, and optionally applicable and claimable. Further advantages, features and details of the invention are given by the following description of the preferred exemplary embodiments, and the drawings.

DETAILED DESCRIPTION

For simplicity, in FIG. 1 to FIG. 9, parts that are the same or similar, or parts that perform the same or similar function, are denoted by the same reference numeral.

Figure 1:
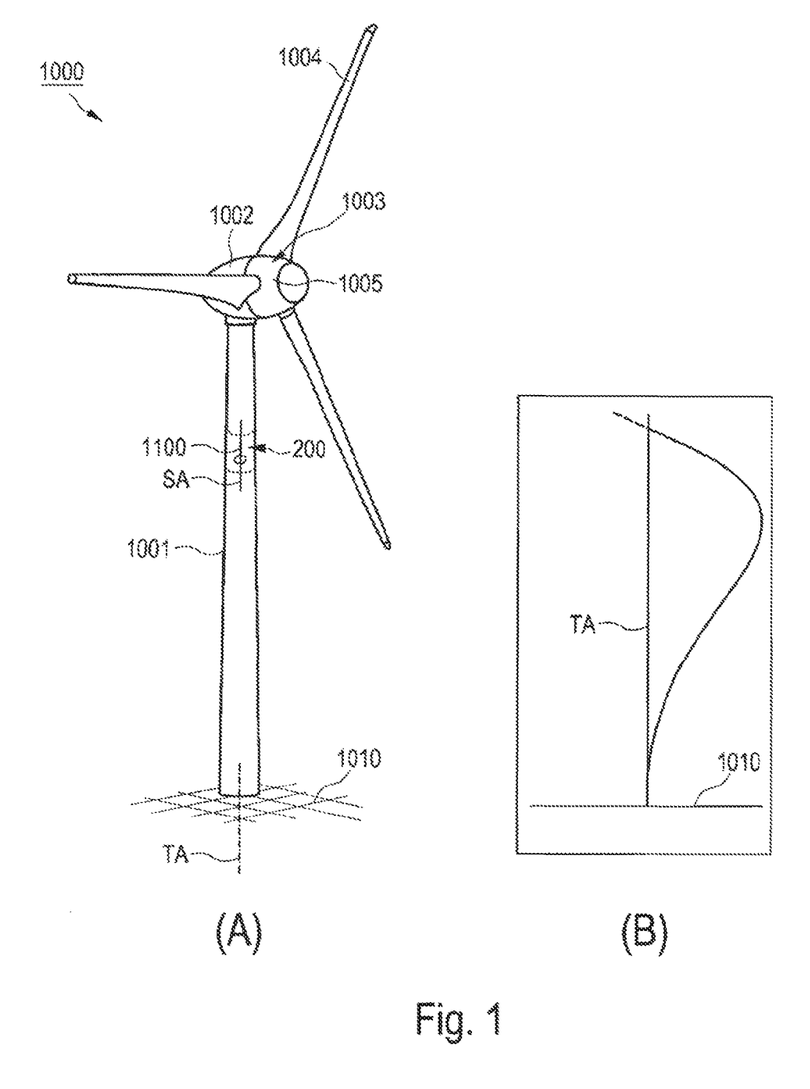
FIG. 1 a schematic representation of a wind turbine, as an example of a structural installation that, particularly because of its slender structural form, is suitable for attachment of a vibration-absorbing device of a preferred embodiment; in view (A) the wind turbine is shown with a hollow tower, and view (B) shows a particularly notable higher natural-frequency amplitude of a spatial mode on the hollow tower, in particular of a second natural frequency in a region at approximately ⅔ of the height of a wind turbine.

FIG. 1, in view (A), shows a wind turbine 1000 having a tower 1001 and a nacelle 1002 that is mounted on the tower 1001. The nacelle 1002 carries a rotor 1003, which has a number of rotor blades 1004, in this case three. A rotor blade 1004 of the rotor 1003 is connected, via a hub 1005, to a shaft, not represented in greater detail, in the nacelle 1002. For this purpose, a rotor blade 1004 is connected to a hub adapter via a blade bearing, and coupled to the shaft. When the rotor 1003 is rotating, driven by wind, a generator disposed in the nacelle 1002 can be driven, via the shaft, for the purpose of generating electricity. The electrical energy supplied by the generator can be converted, by means of electrical power converters, transformers and similar further appropriate electrical devices, for feed-in to an electric grid, not transferred in greater detail; the devices may be disposed in the nacelle 1002 or on the ground 1010, in the tower 1001 or outside of the tower 1001 of the wind turbine 1000.

The tower 1001 of the wind turbine 1000 is let into the ground 1010 via a foundation, not represented in greater detail. The tower 1001 of the wind turbine 1000 is constructed from a number of tower segments 1100—for example, realized as hollow-cylindrical steel or prestressed concrete segments. A tower segment 1100, not designated in greater detail here, disposed between the nacelle 1002 and the ground 1010 is equipped with a vibration-absorbing device 200, which is explained in relation to the subsequent FIGS. 4 to 9, in a preferred embodiment.

It has been found that a wind turbine 1000, particularly in the case of increasingly larger design, does not merely have to satisfy more stringent requirements in respect of damping and/or absorption of unwanted vibration; it was also necessary to specify a design of a vibration-absorbing module 100, or of a vibration-absorbing device 200, that is sparing of resources. Since the occurrence of high amplitudes of pronounced resonant phenomena in the case of a wind turbine 1000 was to be prevented as reliably as possible, a vibration absorber module 100, in particular, has proved advantageous, and it is described here, as an example, in the context of a particularly preferred embodiment. Nonetheless, it is to be understood that the vibration absorber module 100 described here, even if initially of a passive design and realized without expressly stated damper means that go beyond self-damping, can nevertheless be further developed as a module—in particular, provided with appropriate active feedback control and/or damping—that reduces vibration in general.

There are very many different ways in which a wind turbine 1000 can be excited to vibrate, and a spectrum of unwanted vibration, or unwanted vibration phenomena, can be broken down into differing natural vibration modes, each having a spatially distinct mode. Owing to the large number of possible vibration excitations, a spectrum of unwanted vibration, or an unwanted vibration phenomenon, having differing modes in a first and, in particular, in the higher natural frequency beyond the latter, proves to be comparatively complex.

For example, periodic or other internal and external forces may be superimposed on free and self-excited vibrations of the wind turbine 1000 in order to excite oscillatory motions. In particular, it has been found that wind-induced vibrations, particularly resulting from gusts or vortex shedding, can result in comparatively complex vibration phenomena, particularly in the lower frequency range. Periodic and comparatively high-frequency vibration excitations can also result from two serially positioned wind turbines becoming coupled as a result of vortex shedding, also referred to as buffeting. In general, the influencing of wind flows can have the result that wind turbines positioned close to each other are subjected to extensional and bending, or torsional, vibrations, such as, for example, in the case of galloping or fluttering. In particular, such and other excitations of the rotor blades additionally result in a pitching moment of the nacelle 1002 and in an excitation spectrum of the tower 1001 that includes modes beyond the first natural frequency.

Figure 8:
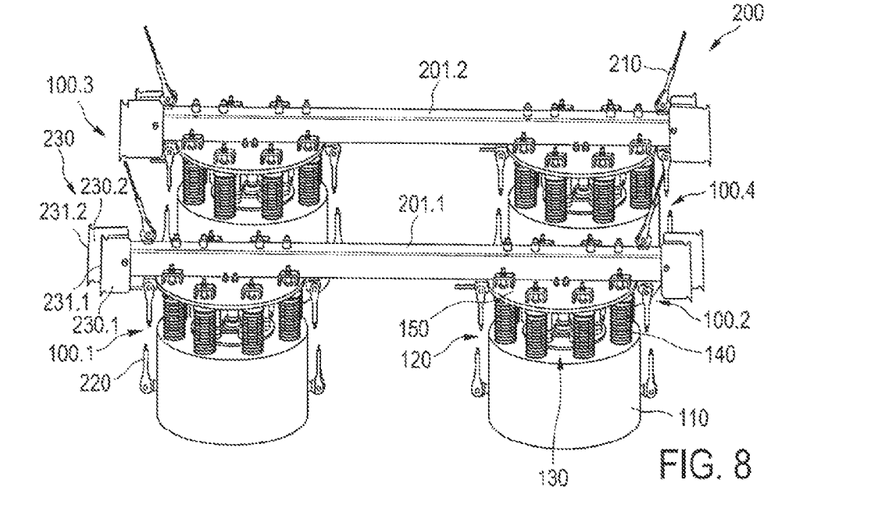
FIG. 8 a perspective overall view of a particularly preferred embodiment of a vibration-absorbing device having four vibration absorber modules of FIG. 4 and FIG. 5.
Figure 9:
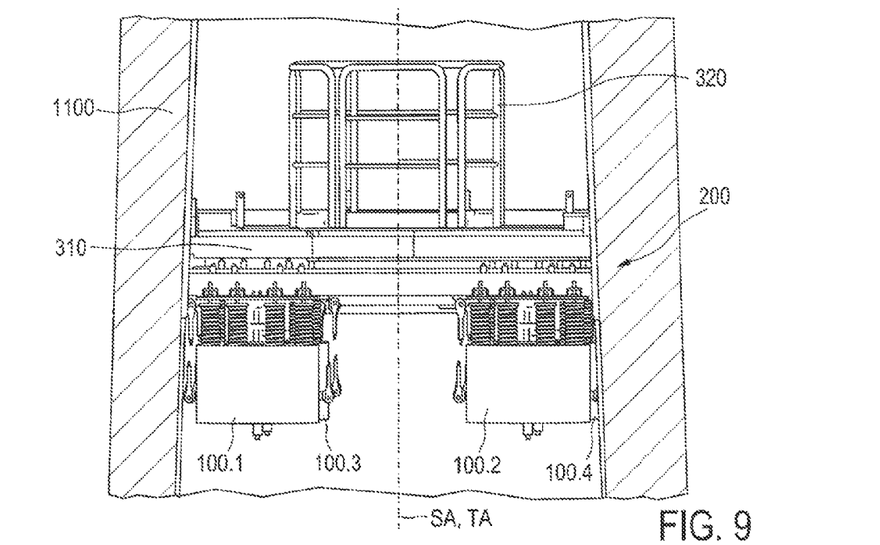
FIG. 9 a partially perspective, lateral sectional view of a tower segment for a wind turbine having a vibration-absorbing device of FIG. 8.

HA, firstly, denotes the suspension axis of a vibration-absorbing module 100, which axis is substantially parallel to a symmetry axis SA of a vibration-absorbing device 200 shown in detail in FIG. 1 and FIG. 8 and FIG. 9—in which the symmetry axis SA corresponds substantially to the tower axis TA.

FIG. 1 view (B) shows, as an example, the plotted graph of an amplitude of a higher, in this case second, natural frequency of a mode of the tower 1001. It is possible, for example, to simulate or measure an exact knowledge of a maximum amplitude of a mode on the tower 1001; thus, it is known that it is precisely natural modes above the first natural frequency that occur in a region above half the height of the tower 1001. It has been found that particularly reliable reduction of such amplitudes can be achieved by a vibration-reducing device having a vibration-reducing module disposed approximately at the height of the greater amplitude of the mode.

Particularly advantageous as a suitable basis is a vibration absorber module 100, or a vibration-absorbing device 200, as described in FIG. 4 to FIG. 9. This device may be further supplemented, advantageously, by damping or active feedback control elements, in order to achieve a more broadband frequency spectrum of absorption frequencies with an additional vibration damper, or active damping properties.

Given that wind turbines differ in their structural form, it is useful to tune a vibration absorber module 100, or vibration-damping device 200. Although it is apparent that a higher natural mode of a tower 1001, or wind turbine 1000, is in part non-dependent on wind direction, it is nevertheless also useful, where necessary, for the vibration absorption properties to be set, in part, in dependence on wind direction.

The basis of the present embodiment is a vibration-absorbing module 100, or vibration-absorbing device 200 that, for the purpose of absorbing vibration, is disposed at a height of approximately ⅔ of the length of the tower 1001, i.e., approximately at the height of the greatest amplitude of a higher mode; it is disposed thus, for example, in a manner shown in FIG. 8 and FIG. 9. The embodiment of the vibration-absorbing module 100, or vibration-absorbing device 200, as an initially purely absorbing and passive element, can be designed to be durable—in particular, for the nominal service life of the wind turbine—and used for a very wide temperature range, from −40° C. to +60° C.

By setting of a so-called "effective pendulum length"—yet without alteration of an actual length of a suspension system and/or alternation of the pendulum mass—the vibration absorber module 100, or vibration-absorbing device 200, described in the following can be set to a disturbance frequency in respect of the absorption frequency; it is thus possible to fine-tune the entire vibration-reducing system. In the present case, a natural frequency of 1.48 Hz is to be reduced in a frequency range from 0.4 to 3 Hz.

Figure 2:
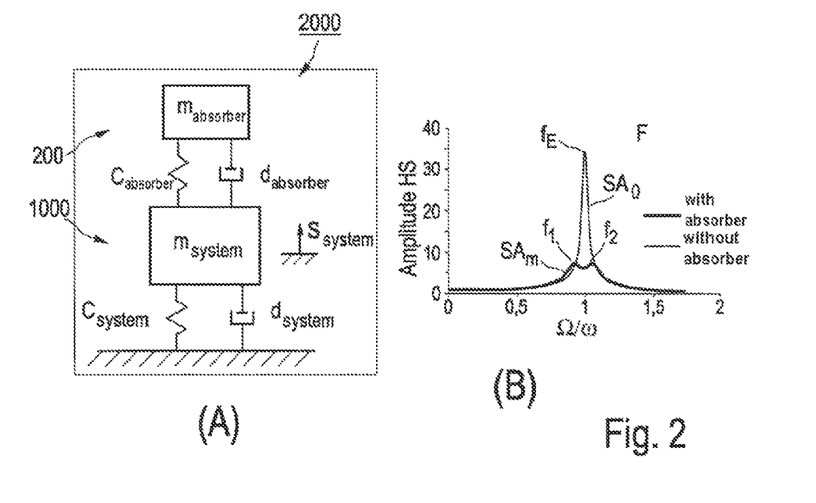
FIG. 2 in view (A), a schematic representation of the elements of a general vibration-absorbing structure with damping in respect of a main structure susceptible to unwanted vibration, view (B) showing a representation of an unwanted vibration of a tower of a wind turbine with and without vibration absorption.

Shown schematically in FIG. 2 view (A) is a system 2000—as an example, e.g., for that of a wind turbine 1000—having a vibration-reducing device 200 coupled to a structure that is capable of vibration—such as, for example, a tower 1001 of a wind turbine 1000, constituting the coupled system 2000 comprising a device 200 and a wind turbine 1000—having a system mass msystem of the wind turbine 1000 and an absorber mass $M_{absorber}$, i.e., substantially a pendulum mass 110. The arrow direction represented by $S_{system}$ denotes the symmetry axis of the tower 1001 of the wind turbine 1000. The oscillatory capability and damping are represented by a spring constant $C_{system}$ and a damping constant $d_{system}$, and for the absorber by a spring constant $C_{absorber}$ and a damping constant $d_{absorber}$. The spring constants detune the absorber frequencies of the absorber in respect of a disturbance frequency of the system; they thus serve principally to set the absorber frequency, in order to increase the absorbing and, if appropriate, additionally damping effect of the absorber.

In relation to this FIG. 2 view (B) shows, for the model in view (A), the resulting amplitude of an unwanted vibration $SA_0$, the unwanted vibration having a natural frequency $f_E$, without any vibration-reducing, in particular any vibration-damping, measure. $SA_m$ represents the progression of a reduced unwanted-vibration amplitude, a dynamic vibration absorber being used, which is of an undamped, passive design. As is the case generally, and also in the case of the coupled system 2000 represented in FIG. 2 view (A), the natural frequency $f_E$ of the represented mode is split into two frequencies $f_1$, $f_2$, which are close to each other, lying around the natural frequency $f_E$ of the unwanted vibration. One advantage is the virtually complete extinction, or in any case great reduction, of the amplitude in the case of $f_E$ at least to ⅔ of the original value. It may be necessary to take into account that, outside of the natural frequency $f_E$, comparatively low amplitudes of the frequency split $f_1$, $f_2$ are obtained. For this reason, in particular, it may be useful for the embodiment of a vibration absorber, which is represented further here, to be provided with additional damping, or active feedback control, in order also to reduce the amplitudes of the split frequencies $f_1$, $f_2$ of the coupled system 2000.

Figure 3:
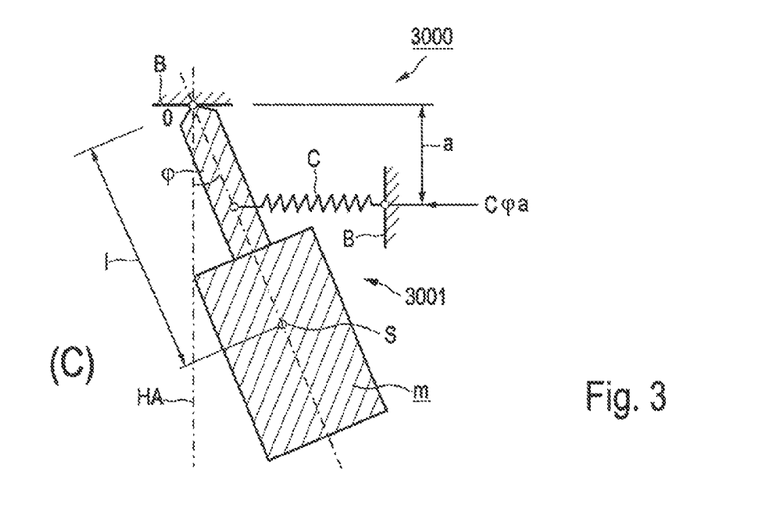
FIG. 3 a schematic representation of a vibration-absorbing module, as a pendulum system having a pendulum mass and having a laterally engaging spring element.

Shown schematically in FIG. 3 is the basic functioning of a vibration absorber system 3000, realized as a pendulum system. It is possible to describe, at a suspension point 0 on the structure B, a pendulum 3001, which can be described in respect of the center of mass S and has the length l and a pendulum mass m, in the case of a deflection φ in relation to the suspension axis HA, and which has an elastic spring coupling, of a spring constant C, to the structure B. A motion equation for the vibration absorber system 3000 also includes, in addition to the pendulum length l and the pendulum mass m, the spring constant C and a distance a in relation to the suspension point 0; this is described, for example, by Petersen in "Dynamik der Baukonstruktion" (Vieweg 2000, first edition, Munich). By means of the corresponding elastic, or damping, spring C, which is represented as a spring, a pendulum mass, represented with its center of mass S, can be deflected by the angle; the spring constant C in this case detunes the natural frequency of the pendulum, i.e., in this case it serves primarily to set the absorber frequency, in order to increase the absorbing and, if appropriate, additionally damping effect of the device 200.

Altogether, according to Hooke's law, and with knowledge of the spring rate and the elongation, or compression, a spring length can be set as F=C*Δl or, in the case of pretensioning, as F=C*($L_v$+−Δl).

Figure 4:
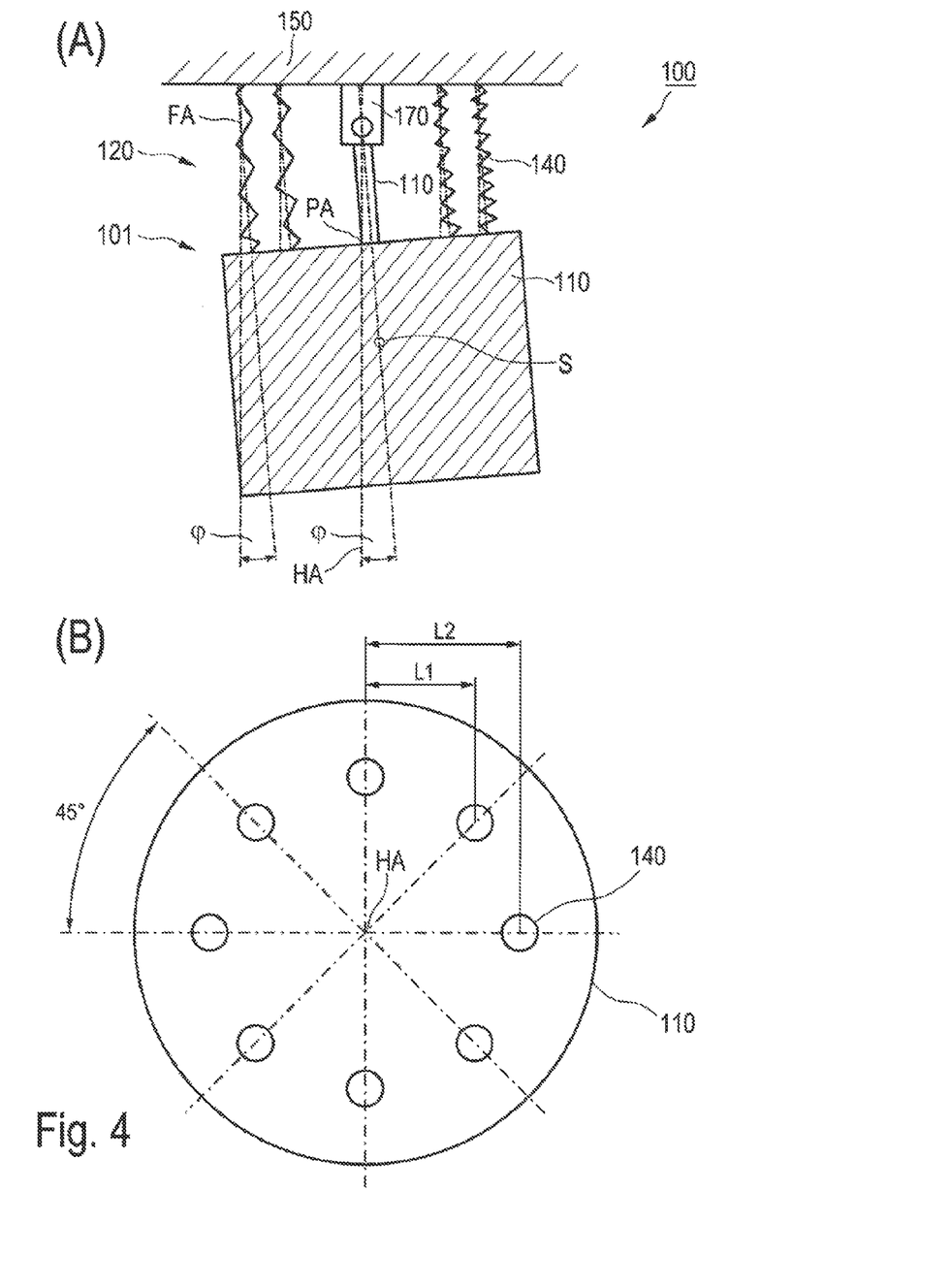
FIG. 4 in view (A), a schematic representation of a particularly preferred embodiment of a vibration absorber module, as a pendulum system having a pendulum mass, a number of pendulum spring elements, and having a suspension system, and view (B) showing a preferred circumferential distribution of the pendulum spring elements of the suspension system of FIG. 4(A)

Going beyond this, shown schematically in FIG. 4 view (A) is a particularly preferred embodiment of a vibration absorber module 100 for a vibration-absorbing device 200, described further in FIG. 8, for use in the case of a wind turbine 1000 represented in FIG. 1 and FIG. 9. The vibration absorber module 100 is designed for suspended attachment to the vibration-absorbing device 200 and, via the latter, to the tower segment 1100 of the wind turbine 1000. For this purpose, the vibration absorber module 100 has a pendulum system 101, having a pendulum mass 110 and having a suspension system 120 for suspending the pendulum mass 110 on a bearing structure 150. The suspension system 120, in addition to having a pendulum mass suspension 130, which is fastened to the structure 150 by means of a suspension head 170, also has a number of pendulum spring elements 140 that extend, between the pendulum mass 110 and the bearing structure 150, in the direction of a suspension axis HA of the vibration absorber module 100; the suspension axis HA corresponds substantially to a tower axis TA shown in FIG. 1.

In the present case, the suspension system 120 is shown for a center of mass S of the pendulum mass 110 that is deflected, relative to the suspension axis HA, by the deflection φ. In the non-deflected state, the spring axes FA of the pendulum spring elements 140 that are shown here, and also the axis PA of the pendulum mass suspension 130, are substantially parallel to the suspension axis HA and, in the deflected state, are deflected relative to the suspension axis HA.

FIG. 4 view (B) shows, furthermore, that eight pendulum spring elements 140 are distributed symmetrically around the suspension axis HA; in the case of the embodiment of a vibration absorber module 100 that is represented symbolically in this case, these pendulum spring elements are thus aligned vertically, i.e., with their spring axis FA parallel to the suspension axis HA when they are in the non-deflected state and, when in the deflected state, carried along substantially parallel to the pendulum axis PA of the pendulum mass suspension 130.

Figure 5:
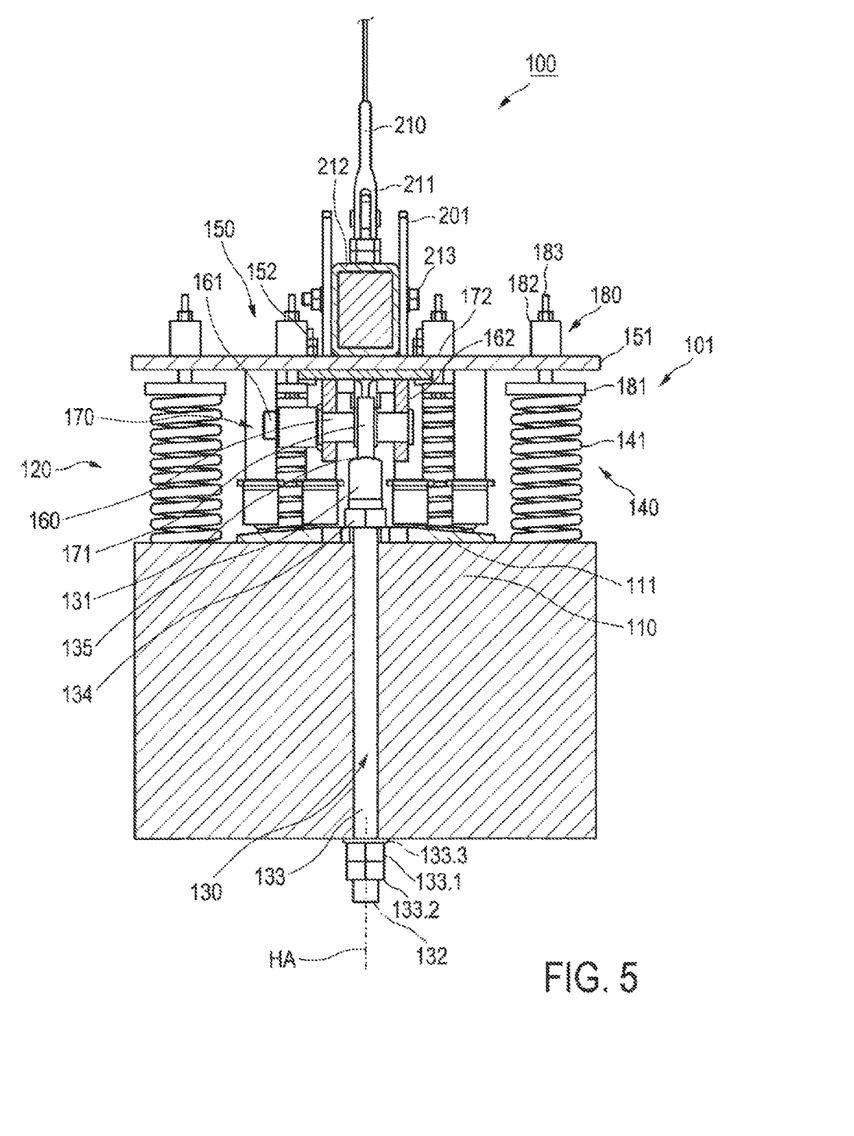
FIG. 5 a particularly preferred design of the preferred embodiment of the vibration absorber module of FIG. 4.
Figure 7:
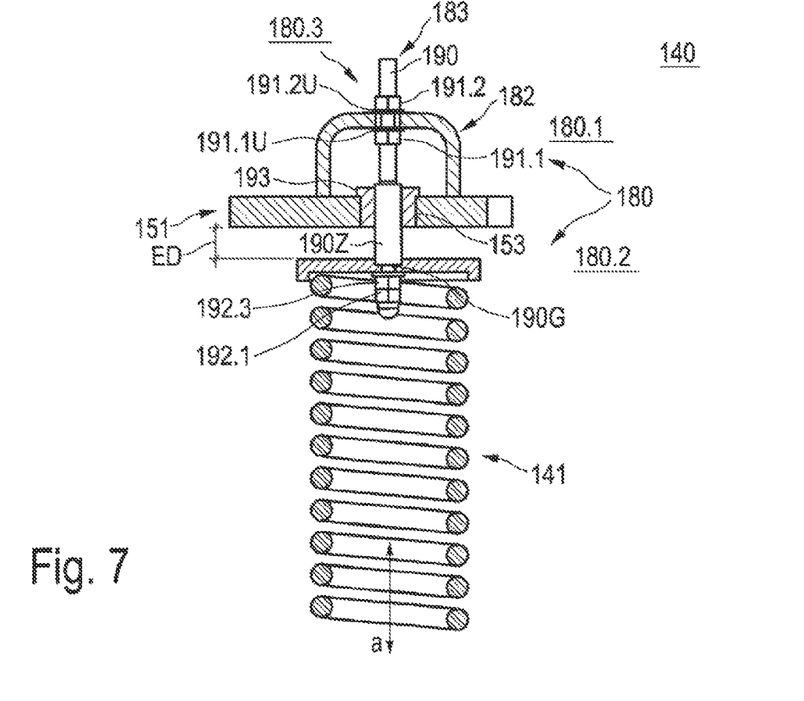
FIG. 7 a detail of a pendulum spring element of the embodiment of the vibration absorber module of FIG. 4 and FIG. 5.

As explained in detail on the basis of the succeeding figures, FIG. 5 and FIG. 7, the spring elements 140 are preferably designed for setting the vibration absorber module 100. A vibration absorber module 100 that can be used in real conditions should, in principle, be configured such that it can be set, in order to design an absorber frequency f in respect of a frequency spectrum F of an unwanted vibration, in particular in order to tune the absorber frequency f to a natural frequency $f_E$. This tuning requirement may arise, for example, as a result of production tolerances, such as geometry deviations, mass deviations and deviating spring rates, in the case of a wind turbine 1000, even if a disturbance frequency spectrum can be calculated on the basis of the structural design.

Basically, the vibration absorber module 100 represented in detail in FIG. 5 provides for the possibility of setting the pendulum spring elements 140; this has the advantage of avoiding elaborate alteration of the length of the pendulum mass suspension 130. This also has the advantage that the pendulum mass suspension 130 can be specifically designed to achieve a durable, maintenance-free and yet simple design of the suspension system 120.

In particular, it has been recognized, in the context of the present embodiment and generally, that altering a pretension of a pendulum spring element 130, in particular by altering a pretension length of a spring 141, designed as a compression spring, of a pendulum spring element 140, is effective in achieving an effect similar to that achieved by increasing the pendulum mass or altering the pendulum length. In the present case, this situation is described with reference to an effective alteration of the pendulum length—meaning an effective—but not spatial—extension or alteration of a pendulum length l, merely through the design of a spring pretension of a pendulum spring element 140, in particular by using the spring length of the spring 141 to set a compressive spring force of the compression spring of the pendulum spring element 140.

In particular, as further shown by FIG. 4, it is provided that the pendulum mounting is supplemented with compression springs of a number of pendulum spring elements 140; by means of a bearing structure plate 151, the pressure is applied, in the present case, on eight compression springs. The pendulum spring elements 140 are uniformly distributed along a circumferential course. A setting means, for setting a spring length for a pendulum spring element 130, is realized in such a manner that a rotary motion that determines adjustment can be converted into a translational motion that sets pressure.

The disposition of, in the present case, eight pendulum spring elements 140 distributed on a circular circumference allows the pendulum mass 110 to spring against the bearing structure plate 151 in a largely uniform manner in all directions of motion; this is achieved with a technically acceptable resource requirement. It is generally the case, moreover, that a greater number of pendulum spring elements 140 would reduce a directional dependence of the pendulum characteristics. In the present case, it proves to be particularly advantageous that the pendulum spring elements 140 are attached to a supporting structure 150 at virtually the same height as a pendulum mass suspension 110, namely, in that there is an attachment point on the same plane of the bearing structure plate 151.

FIG. 5 shows in detail a vibration absorber module 100 with the pendulum system 101 on a bearing structure 150. The bearing structure 150 has a bearing structure plate 151, attached to the underside of which—in the vertical direction, i.e., suspended along the suspension axis HA—is the pendulum system 101 with the suspension system 120 for suspended attachment of the pendulum mass 110.

The bearing structure plate 151 itself is held, on its top side, by a profile carrier 201 of the vibration-absorbing device 200. The profile carrier 201 may be fixed, for example, to a tower segment 1100 of the tower 1001 of the wind turbine 1000.

In addition, the profile carrier 201 is held by means of a tensioning and clamping device 210. The tensioning and clamping device 210 can be varied in length. At its lower end, the tensioning and clamping device 210 has a joint 211, to which a fastening profile 212 is attached in a manner permitting angular adjustment and fitted into the receiving region of the profile carrier 201. Extending through both sides of the fastening profile 212 and the carrier profile 201 is a carrying screw 213, which sits against the outside of the carrier profile 201 on both sides, in particular, in the present case, fastened by a nut.

The bearing structure plate 151, on its underside, on the one hand provides at the same height a flat stop surface for a joint head 131 on a suspension head 170 of the pendulum mass suspension 130; the joint head 131 has a pendulum bearing 160, realized as a slide bearing, that is realized between a bearing pin 161 and a bearing pin receiver 162.

Figure 6:
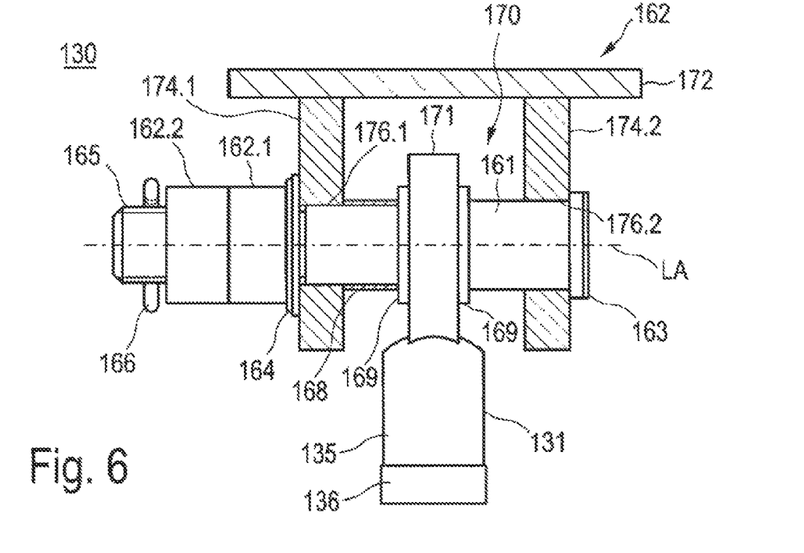
FIG. 6 a detail of a pivot head of the pendulum mass suspension of a suspension system in the case of the vibration absorber module of FIG. 4 and FIG. 5.

FIG. 6 shows the suspension head 170 in detail, and shows the design of the joint head 160, with a carrier plate 172 of the bearing pin receiver 162 and an inner ring 171 on the bearing pin 161. In the present embodiment, the carrier plate 172 of the bearing pin receiver 162 is fixed to the bearing structure plate 151 by screwed connections 152 that sit against an underside of the carrier plate 172 and a top side of the bearing structure plate 151. The carrier profile 201 can be fixed, at its abutting edge, to the bearing structure plate 151, for example by welding or else by material bonding, form closure or force closure.

The bearing pin receiver 162 additionally has a first and a second side plate 174.1, 174.2, disposed perpendicularly in relation to the carrier plate 172. Each of the side plates 174.1, 174.2 has a bearing bore 176.1, 176.2, which are realized to receive the bearing pin 161, preferably in a precisely fitting manner, along the bearing axis LA. The bearing pin 161 itself is fixed, on an outside of a second side plate 174.2, by means of a stop 163 of the bearing pin 161. The bearing pin 161 is fixed by a locknut on a first outer side of a first side plate 174.1, and for this purpose has an external thread 165. A first and a second locknut 162.1, 162.2 on the external thread 165 are spaced apart from the first outer side of the first outer side plate 174.1 by means of a washer 164 and, by means of a split pin 166 at the end of the bearing pin 161, are additionally secured against slackening. The nuts 162.1, 162.2 are each preferably realized as hexagon nuts. Between the side plates 174.1, 174.2, an inner ring 171 of the bearing pin is held centrally spaced between the side plates 174.1, 174.2 by a spacer bush 168.

A slide surface, constituting a slide bearing, is realized on an inside of the inner ring 171 that faces towards the bearing pin. On its outer sides that face towards the side plates 174.1, 174.2, the inner ring 171 is additionally sealed on both sides by a lip seal 169. In the present case, the lip seals 169 are composed of polyurethane, and thus have good cold-state elasticity and low restoring forces.

The inner ring 171, with its slide surface lying in a precisely fitting manner on the bearing pin 161, together with the opposing slide surface of the bearing pin 161 that faces towards the slide surface of the inner ring, constitutes the slide bearing. In this case, the slide surfaces of the slide bearing are composed of roller-bearing steel. All components of the joint head 131, as well as the bearing pin 161 and the bearing pin receiver 162, are provided with a zinc coating that protects against corrosion. Additionally or alternatively, particularly if required, the joint head 131 may also be provided with a Teflon slide coating in the region of the slide layer. This reduces the frictional resistance and ensures the durability of the slide bearing.

The joint head 131 continues, integrally or in a form-closed manner, into a pendulum rod 133 of the pendulum mass suspension 130. The pendulum rod 133 extends centrally through the pendulum mass 110 and, at its lower end 132, carries a set of locknuts 133.1, 133.2 on a washer 133.3, which are secured against slackening.

Provided between the joint head 131 and the pendulum rod 133 there is an extension piece 135 that, as an extension, appropriately continues the inner ring 171 and that directly adjoins the pendulum rod 133. Between the extension piece 135 constituting a stop 136, a further locknut 134 sits on the pendulum rod and fixes a pressure plate 111 in position above the pendulum mass 110. The pendulum mass 110 is fixed between the pressure plate 111 and the washer 133.3, this fixing corresponding to the torque of the locknuts 134, 133.1, 133.2.

With further reference to FIG. 5 and FIG. 7, these figures show a number of pendulum spring elements 140 in the direction of the suspension axis HA between the pendulum mass 110 and the supporting structure 150, namely, and specifically, between a top side of the pendulum mass 110 and an underside of the supporting structure plate 151. The parts are represented in detail in FIG. 7, a pendulum spring element 140 having, in respect of the bearing structure plate 151, a spring 141 designed as a compression spring. The pendulum spring element 140 also has a setting mechanism 180, of which a first part 180.1 is located above the bearing structure plate 151 and a second part 180.2 is located beneath the bearing structure plate 151. The setting mechanism 180 additionally has a third part 180.3, which is located on a guide rod and which, specifically, is realized to displace the second part 180.2 against the first part 180.1.

For this purpose it is provided, specifically, that a spring disc 181 is provided, beneath the bearing structure plate 151 and spaced apart from the latter, as a base for the second part 180.2. The spring disc 181 holds the spring 141, realized as a compression spring, under compressive stress under the spring disc 181, such that this spring is pretensioned through shortening of its spring length. A distance ED for setting the spring length a can be set by means of the aforementioned third part 180.3 of the setting mechanism 180.

A carrier profile 182, by constituting a first part 180.1 of the setting mechanism 180 above the bearing structure plate 151, holds the variably settable adjuster 183, as a third part 180.3 of the setting mechanism. The adjuster 183 is part of a spring pretensioning system, which is supported against the first part 180.1 in the form of the carrier profile 182, and which, by means of the first part 180.1, imparts a compressive pretension to the spring disc 181, and thereby to the spring 141. In the present case, the third part 180.3 comprising the adjuster 183 works by converting rotary motion into a translational motion. For this purpose, the adjuster 183 is realized substantially as a motion screw.

The friction at the spring ends is kept as low as possible during setting of the pretension length. It is also ensured that the spring disc 131 is not also rotated with the rotation of the guide rod 190. In order to ensure this, the motion screw of the adjuster 183 is provided with a region that has an angular shape, namely, a square profile 190Q. The guide rod 190 is guided in the region of the square profile 190Q. For this purpose, in the present case, circular polymer bushes having a square hole are provided, and bonded-in by means of a two-component industrial adhesive. In a more simple variant, a square hole can be made in the bearing structure plate 151, e.g., by milling, by means of a milling cutter.

The motion screw of the adjuster 183 has a guide rod 190, having the portionally square profile 190Q in the middle portion, which profile sits in the carrier profile 182 that, in the present case, is in the shape of an inverted U-profile. The square profile 190Q is flanked on both sides by a first and a second hexagon nut, as counter-screws 191.1, 191.2 having associated washers 191.1U, 191.2U. Furthermore, the guide rod 190 extends through a guide bush 193 seated in the bearing structure plate 151—namely, let into an opening 153 of the latter.

The guide rod 190 also extends through the spring disc 181; it extends thus without a guide bush between a widened cylinder profile 190Z of the guide rod 190 and a threaded extension 190G of the guide rod 190. For the purpose of forming the widened cylinder profile 190Z, the guide rod 190 may also have a narrow cross section, and thus extend through a bush or similar sleeve in order to form the cylindrical outer profile of the cylinder profile 190Z. At an end of the guide rod 190 that is opposite to the square profile in 190Q, the guide rod 190 carries this threaded extension 190G, which is encompassed by a washer and two locknuts 192.1, 192.2—one realized as a hexagon nut, the other as a cap nut.

FIG. 8 shows a preferred embodiment of a vibration-absorbing device 200 having, in the present case, four vibration absorber modules 100.1, 100.2, 100.3, 100.4. The profile carrier 201 shown in FIG. 5—here, as the profile carrier 201.1 and the profile carrier 201.2—is fixed laterally, by flanges or similar attachment structures 230, in a tower segment 1100. In the present case, a first, shorter web 230.1, having a first bent-over end flange 231.1, and a second, longer web 230.2, having a second bent-over end flange 231.2, are provided for the first profile carrier 201.1, in order to realize an attachment that is appropriate for the course of the internal circumferential surface of the tower segment. Here, two vibration absorber modules 100.1, 100.2, and 100.3, 100.4 are in each case fixed in pairs to a carrier profile 201.1 and 201.2, respectively, of a bearing structure 150. Also shown—in addition to the feature already explained in FIG. 5 to FIG. 7—is a tensioning structure 220, which can be tensioned in a settable manner and which serves as an anti-drop safeguard; in the present case, as an example, it connects the pendulum mass 110 to a carrier profile 201.1 and 201.2, respectively.

The structure of a vibration-absorbing module 100, or device 200, can be installed in the tower segment 1100 in such a manner that it is easily accessible and consequently, most importantly, requires no maintenance and is resistant to wear. Stop buffers may be provided on a vibration absorber module 100, or in the vibration-absorbing device 200, in order to limit spatially a maximum swing of a module and thus protect the tower segment 1100 against damage. As represented in detail in FIG. 9, a vibration-absorbing device 200 may be accessed via a landing 300. A platform 310 of the landing 300 is disposed above the platform constituted by the carrier profile 201.1, or 201.2. The landing 300 has a support guard rail 320 around a free space along the tower axis TA, via which it is possible to access the vibration-absorbing device 200; the support guard rail 320 may be removed or bypassed for this purpose. A spring length for a pendulum spring element 130 can thus be set, not only with the use of a standardized tool, but also comparatively easily. Moreover, a spring length can be set in a manner that permits calibration and measurement; altogether, the vibration-absorbing device 200 can be set in a simple and determinable manner, with comparatively little resource requirement.

LIST OF REFERENCES 100 vibration absorber module
100.1, 100.2, 100.3. 100.4 vibration absorber modules
101 pendulum system
110 pendulum mass
111 pressure plate
120 suspension system
130 pendulum mass suspension
131 joint head
132 lower end
133 pendulum rod
133.1, 133.2 locknut of a set of locknuts
133.3 washer
134 further locknut
135 extension piece
136 stop
140 pendulum spring element
141 spring
150 bearing structure
151 bearing structure plate
152 screwed connection
153 opening
160 pendulum bearing
161 bearing pin
162 bearing pin receiver
162.1, 162.2 nut/locknut
163 stop
164 washer
165 external thread
166 split pin
168 spacer bush
169 lip seal
170 suspension head
171 inner ring
172 carrier plate
174.1, 174.2 side plate
176.1, 176.2 bearing bore
180 setting mechanism
180.1 first part
180.2 second part
180.3 third part
181 spring disc
182 carrier profile
183 adjuster
190 guide rod
190Z cylinder profile
190G threaded extension
190Q square profile
191.1, 191.2 counter-screws
191.1U, 191.2U washers
192.1, 192.2, 192.3 locknuts
193 guide bush
200 vibration-absorbing device
201 profile carrier/carrier profile
201.1, 201.2 profile carrier/carrier profile
210 tensioning and clamping device
211 joint
212 fastening profile
213 carrying screw
220 tensioning structure
230 attachment structure
230.1 first web
230.2 second web
231.1 first flange
231.2 second flange
300 landing
310 platform
320 support guard rail
1000 wind turbine
1001 tower
1002 nacelle
1003 rotor
1004 rotor blades
1005 hub
1010 ground
1100 tower segment
2000 system
3000 vibration absorber system
3001 pendulum
B structure
C elastic, or damping, coupling
ED distance
F frequency spectrum
FA spring axis
HA suspension axis
LA bearing axis
PA axis
S center of mass
SA symmetry axis
TA tower axis

The invention claimed is:

1. A vibration-reducing module, comprising:
a bearing structure;
a pendulum system having a pendulum mass and a suspension system for suspending the pendulum mass on the bearing structure, the suspension system having a pendulum mass suspension that extends in a direction of a suspension axis and is fastened to the bearing structure by a suspension head, the suspension system having a plurality of pendulum spring elements extending in the direction of the suspension axis, and the suspension head of the pendulum mass suspension having a joint head that is fastened to the bearing structure and has a pendulum bearing that is a slide bearing, wherein the plurality of pendulum spring elements each include a spring disc that is spaced apart from a first side of a base plate; and
a carrier profile on a second side of the base plate, the carrier profile having a variably settable setting mechanism, and the carrier profile having a stop and an adjusting means.

2. The module according to claim 1, wherein the plurality of pendulum spring elements include compression springs.

3. The module according to claim 2, wherein the plurality of pendulum spring elements each have a spring mounting designed for variably setting a spring length of the spring and for setting a compressive spring force of the spring.

4. The module according to claim 2, wherein the springs have an end connected directly or indirectly to the pendulum mass.

5. The module according to claim 1, wherein the setting mechanism has a guide rod having a rotary thread that engages in a threaded hole that serves as a stop, the guide rod having a proximal portion having a point of application for rotary means and distal portion having an adjusting means for displacing the spring disc.

6. The module according to claim 1 wherein the pendulum mass suspension is invariable with respect to length and direction.

7. The module according to claim 1, wherein each of the plurality of pendulum spring elements has a first spring and a second spring, wherein the first and second springs are compressive springs, the first springs having differing compressive spring forces from the second springs.

8. The module according to claim 1, wherein each of the plurality of pendulum spring elements has a first spring and a second spring, wherein the first and second springs are compressive springs having the same compressive spring force.

9. The module according to claim 1, wherein the plurality of pendulum spring elements are of an even number.

10. The module according to claim 1, wherein the plurality of pendulum spring elements are disposed symmetrically with respect to an angle of rotation about the pendulum mass suspension that is disposed centrally on the suspension axis.

11. The module according to claim 1, wherein the plurality of pendulum spring elements are fixed to a top side of the pendulum mass.

12. The module according to claim 1, wherein the pendulum mass suspension has a pendulum rod having a proximal end that is coupled to the joint head.

13. The module according to claim 12, wherein the pendulum rod extends through the pendulum mass along the suspension axis, and the pendulum mass has a bottom side that abuts a distal stop of the pendulum rod and a top side that is held on a counter-stop of the pendulum rod.

14. The module according to claim 1, wherein the joint head includes a bearing pin that is held in a bearing pin receiver, the pendulum mass suspension being held on the bearing pin in a rotatably sliding manner to form the slide bearing.

15. The module according to claim 14, wherein at least one of the slide bearing the joint head, the bearing pin, and the bearing pin receiver have a corrosion protection that includes a zinc coating.

16. The module according to claim 1, wherein at least one slide surface of the slide bearing includes roller-bearing steel.

17. The module according to claim 1, wherein, at the side of an inner ring of the joint head, a bearing pin carries a lip seal.

18. The module according to claim 1, wherein the suspension system has a tensioning structure that is configured to be tensioned in a settable manner, wherein the tensioning structure provides an anti-drop safeguard extending between the pendulum mass and the bearing structure.

19. The module according to claim 1, wherein the pendulum system has at least one damper element that is at least one of an amplitude limiter and end-position limiter.

20. The module according to claim 1, wherein the suspension system includes a pendulum damping that is configured to dampen motion of the pendulum system during a free pendulum motion.

21. The module according to claim 1, further comprising an active control element coupled to the pendulum system, the active control element having an active feedback control system comprising a phase detector, a regulator and a power amplifier.

22. A vibration-reducing device comprising a plurality of vibration-reducing modules according to claim 1, wherein the vibration-reducing device is configured to be attached to a structural installation.

23. The device according to claim 22, comprising an even number of vibration-reducing modules.

24. The device according to claim 22 wherein the plurality of vibration-reducing modules have at least one of a same length, a same direction of swing, and a same spring tension settings.

25. The device according to claim 22 wherein plurality of vibration-reducing modules differ in at least one of length, direction of swing, and spring tension setting.

26. A structural segment for a wind turbine having a module according to claim 1.

27. The structural segment according to claim 26, wherein a plurality of modules are disposed in a circumferentially symmetrical manner with respect to an angle of rotation a central axis.

28. A wind turbine comprising:
a tower having a tower segment that has a vibration-reducing module, the vibration-reducing module including:
a bearing structure;
a pendulum system having a pendulum mass and a suspension system for suspending the pendulum mass on the bearing structure, the suspension system having a pendulum mass suspension that extends in a direction of a suspension axis and is fastened to the bearing structure by a suspension head, the suspension system has a plurality of pendulum spring elements extending in the direction of the suspension axis, and the suspension head of the pendulum mass suspension has a joint head that is fastened to the bearing structure and has a pendulum bearing that is a slide bearing, wherein the plurality of pendulum spring elements each include a spring disc that is spaced apart from a first side of a base plate; and
a carrier profile on a second side of the base plate, the carrier profile having a variably settable setting mechanism, and the carrier profile having a stop and an adjusting means; and
a nacelle mounted on the tower and carrying a rotor.

29. The wind turbine according to claim 28, wherein the tower segment is disposed in a region that is located at approximately ⅔ of a height of the tower.

30. The wind turbine according to claim 29 wherein approximately ⅔ of the height of the tower is plus or minus 20% the height of the tower.

* * * * *